(12) United States Patent
Schillings et al.

(10) Patent No.: US 6,968,396 B1
(45) Date of Patent: Nov. 22, 2005

(54) RELOADING OF HYPERMEDIA PAGES BY SENDING ONLY CHANGES

(75) Inventors: Benoit Schillings, Palo Alto, CA (US); Elias Ross, Kirkland, WA (US)

(73) Assignee: Openwave Systems Inc., Redwood City, CA (US)

( * ) Notice: Subject to any disclaimer, the term of this patent is extended or adjusted under 35 U.S.C. 154(b) by 645 days.

(21) Appl. No.: 09/916,552

(22) Filed: Jul. 26, 2001

(51) Int. Cl.[7] .............................................. G06F 15/16
(52) U.S. Cl. ...................... 709/246; 709/231; 709/234; 709/247
(58) Field of Search .............................. 709/246, 231, 709/234, 247

(56) References Cited

U.S. PATENT DOCUMENTS

| | | | | |
|---|---|---|---|---|
| 5,473,379 A | * | 12/1995 | Horne | 375/240.16 |
| 5,576,767 A | * | 11/1996 | Lee et al. | 375/240.14 |
| 5,861,905 A | | 1/1999 | Brummett | |
| 5,903,673 A | * | 5/1999 | Wang et al. | 382/236 |
| 6,035,412 A | | 3/2000 | Tamer et al. | |
| 6,330,281 B1 | * | 12/2001 | Mann et al. | 375/240.12 |
| 6,347,155 B1 | * | 2/2002 | Persiantsev et al. | 382/236 |
| 6,487,603 B1 | * | 11/2002 | Schuster et al. | 709/231 |
| 6,549,669 B1 | * | 4/2003 | Sundqvist et al. | 382/238 |
| 6,549,773 B1 | * | 4/2003 | Linden et al. | 455/426.1 |
| 6,628,839 B1 | * | 9/2003 | Komiya et al. | 382/248 |
| 6,714,896 B1 | * | 3/2004 | Barrett | 702/189 |
| 6,735,186 B1 | * | 5/2004 | Leppinen | 370/338 |
| 2002/0154698 A1 | * | 10/2002 | Youn et al. | 375/240.17 |

* cited by examiner

Primary Examiner—John B. Walsh
Assistant Examiner—Nghi Tran
(74) Attorney, Agent, or Firm—Blakely, Sokoloff, Taylor & Zafman LLP

(57) ABSTRACT

A comparison of a first version of a resource and a second version of the resource is performed. The comparison performed by a gateway connected to a network. The first version is stored in the gateway. The second version is sent to the gateway by a server connected to the network. When the second version is different from the first version, difference data between the second version and the first version is calculated. The difference data is sent to the client computer using a narrow bandwidth connection. The gateway stores the second version as the first version.

8 Claims, 4 Drawing Sheets

RELOADING OF HYPERMEDIA PAGES BY SENDING ONLY CHANGES

FIELD OF THE INVENTION

The present invention relates generally to field of client-server computing, and more specifically the invention is directed to transmitting data over a narrow bandwidth network.

BACKGROUND

In a client server network, when a client needs to have access to a resource located on a server, the client typically sends a request to the server. The server then sends a copy of the resource to the client. For example, on the Internet, the client may send the request using a web browser to access a web page on a web server.

Depending on the type of network used, the length of time that the client has to wait to receive the resource from the server may vary. For example, when the client is connected to the Internet using a 56 Kbps modem, the wait time may be longer compared to a client using a Digital Subscriber Line (DSL) connection. The wait time may even be longer when the client is a web-enabled wireless device due to the typically narrower bandwidth associated with wireless connections.

In the web environment, the web page sent from the web server to the browser may be stored in the RAM memory of the client computer running the web browser. The web page may also be stored on the computer's hard drive. This is referred to as caching. Caching speeds up access to the web pages. For example, when a request is initiated to retrieve a web page that was visited before, the browser will first look in the cache to see if the requested web page is there. If the web page is found in the cache, the browser loads the web page from the cache rather than obtaining a new copy from the web server.

While caching generally speeds web page access, one side effect is that a web page displayed from the cache may be stale and not be as fresh as the web page available from the web server. To allow retrieving a "fresh" web page, the web browser provides "reload" or "refresh" feature. The "reload" feature is useful to take advantage of web pages which frequently update their contents. For example, a news website such as Cable News Network (CNN) may put new information on their server every couple of minutes. Other examples include servers that provide stock quotes, traffic information, etc.

Activating the "reload" feature causes a request for the most recent information to be sent to the web server. In existing networks, when the "reload" feature is activated, the entire web page is sent from the web server to the client computer. One disadvantage of reloading the same web page is that the response time may not be very fast due to network traffic conditions. For example, when the client computer is connected with the network using wireless communication, the bandwidth is usually limited. As a result, it may take a long time to get a web page downloaded from the network.

HTTP (Hypertext Transfer Protocol) version 1.1 introduced a validator called element tag or Etag, which can reduce network traffic in some instances. The Etags are unique identifiers that are generated by the server. The Etags are changed every time the web pages change. Because the server controls how the ETags are generated, the client computer can be sure that when the ETag matches the web page remains the same. However, the ETag works to reduce network traffic only when the web page is identical with the cached version.

From the foregoing it can be seen that it is desirable to provide an improved method for transmitting information in a narrow bandwidth network environment.

SUMMARY OF THE INVENTION

The present invention includes a method and apparatus for sending a resource to a client computer. The method includes performing a comparison of a first version of the resource and a second version of the resource. The comparison is performed by a gateway connected to a network. The first version is stored in the gateway. The second version is sent to the gateway by a server connected to the network. When the second version is different from the first version, difference data between the second version and the first version is calculated. The difference data is sent to the client computer using a narrow bandwidth connection. The gateway stores the second version as the first version.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Methods and systems for sending web pages to client computers are described herein. As described in greater detail below, a comparison of a cached web page and a web page from a web server is performed at a gateway computer. When the web page from the web server is different from the cached web page, a difference between the two web pages is calculated and sent to the client computer.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Figure 1:
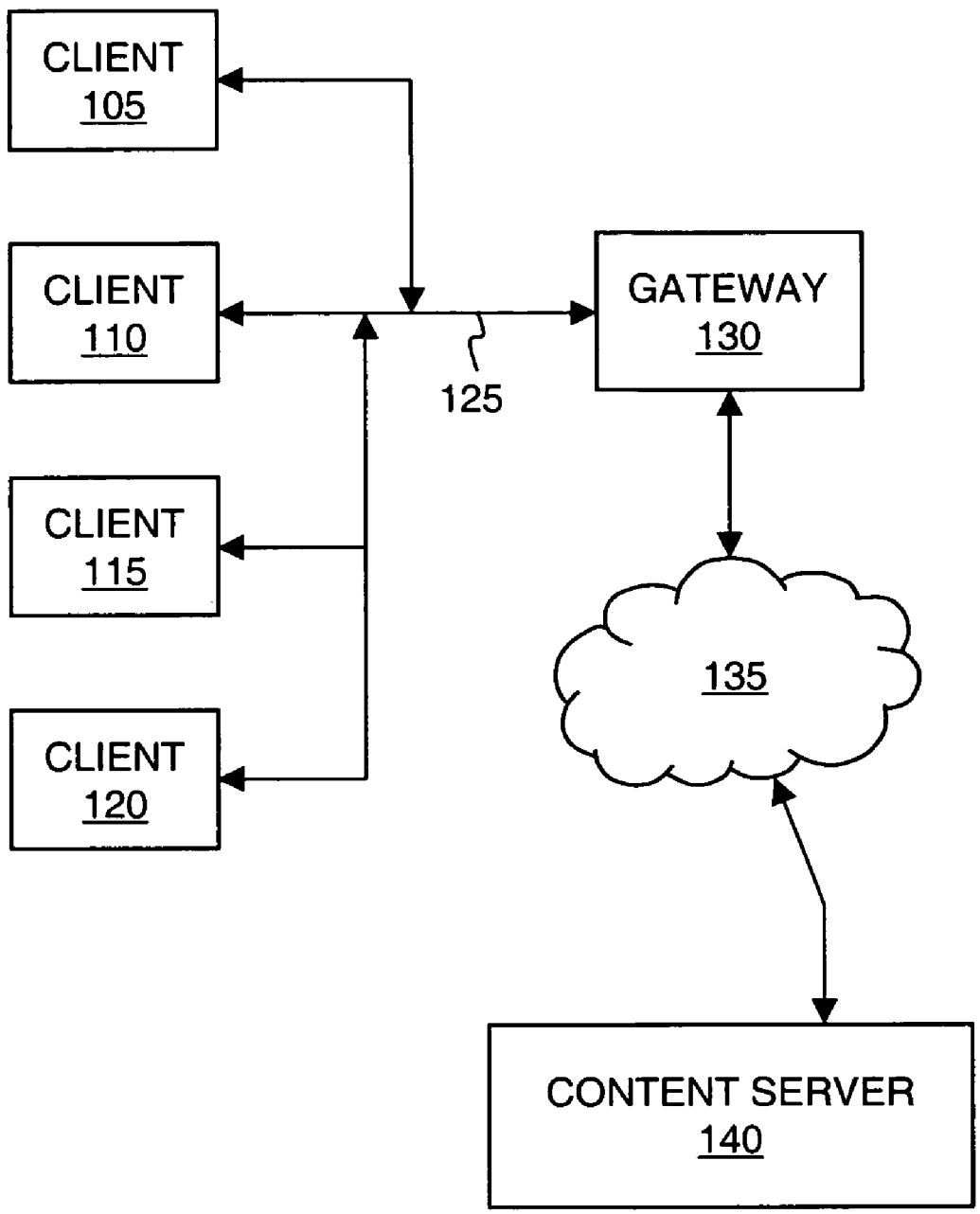
FIG. 1 is a network diagram illustrating a client server network.

FIG. 1 is a network diagram illustrating a client server network. The client computers 105–120 are connected to the network 135 through a gateway computer 130 using connection 125. In one embodiment, the connection 125 is a limited or narrow bandwidth connection such as, for example, a connection over a wireless telecommunication network. The client computer 105 may be a wireless/cellular telephone, which includes a browser for accessing hypermedia content on the Internet using wireless access protocol (WAP). Of course, the client computer 105 may also be a personal digital assistant (PDA) or other similar device that connects to the gateway computer 130 over the narrow bandwidth connection 125. The gateway computer 130 is a network entry point that acts as an entrance to the network 135. For example, the computers that control traffic at an Internet service provider (ISP) are gateway computers. The gateway computer typically knows where to direct a given packet of data that arrives at the gateway computer.

Dynamic entities are frequently generated by the content server 140. As such, an entity transmitted to a client computer 105 may be subsequently changed by the content server 140. For example, when the client computer 105 activates its reload features on the browser, a copy of the current web page is transmitted to the client computer 105 by the content server 140. As discussed above, each client computer caches a copy of the transmitted web page. In one embodiment, the content server 140 transmits the copy of the web page to the client computer 105–120 through the gateway computer 130.

The gateway computer 130 stores a mirror copy of all entities that each of the client computers 105–120 has in its cache. These entities are stored in a global cache in the gateway computer 130. The global cache is used by the gateway computer 130 to determine changes in the entities as sent by the content server 140. This allows the gateway computer 130 to send only the difference data to the client computer 105–120. The difference data represents the difference between the entity as stored in the global cache of the gateway computer 130 and the same entity as sent by the content server 140. Sending the difference data reduces data transmission on the narrow bandwidth connection 125.

Each of the client computers 105–120 needs to be able to determine if the data sent by the gateway computer 130 is the difference data. In one embodiment, a difference data indicator is used by the gateway computer 130 to indicate that the data sent is the difference data. The difference data indicator may be sent as a flag to the client computers 105–120. For example, a bit in the header of a first packet of data sent by the gateway computer 130 to the client computer may be reserved for a difference data indicator flag. When the gateway computer 130 sets the difference data indicator flag to "1", this means the data sent by the gateway computer 130 is the difference data. Alternatively, when the gateway computer 130 resets the difference data indicator flag to "0", this means the data sent by the gateway computer 130 is not the difference data.

When the difference data indicator flag is set, the client computer merges the difference data with the corresponding cached version of the entity to generate a version of the entity that is similar to the version sent by the content server 140. This generated version of the entity is then stored back into the cache, thereby updating the cache. The generated version reflects a most current state of the entity, as it is available in the content server 140.

Figure 2:
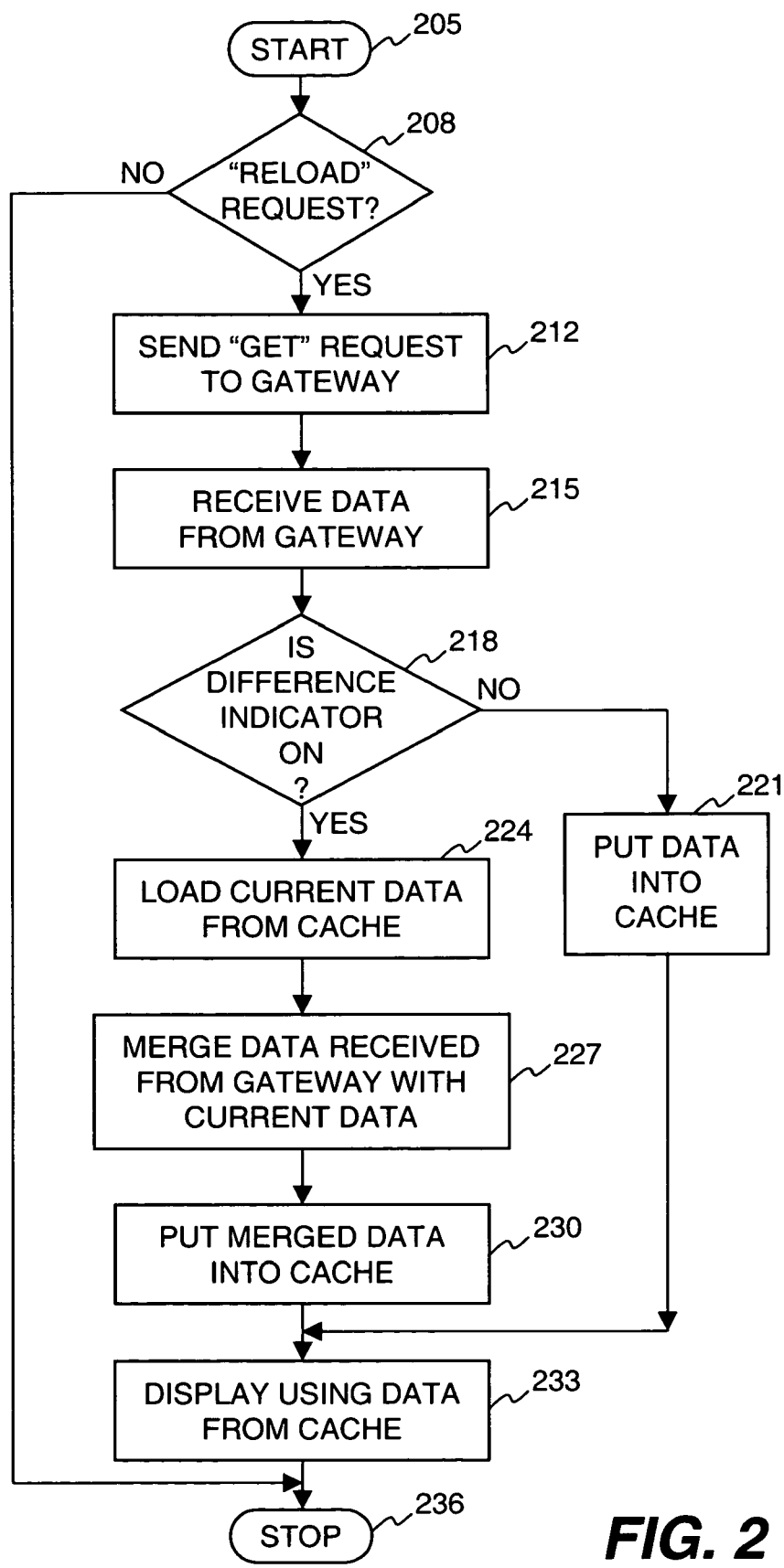
FIG. 2 is a flow diagram illustrating a reload process performed on a client computer.

FIG. 2 is a flow diagram illustrating an example of a reload process that may be performed on a client computer in accordance with the present invention. This process uses the client computer 105 as an example of a client computer that initiates a reload request. The process starts at block 205. At block 208, a test is made to determine if a reload request is initiated. If there is no reload request, the process ends at block 236. When there is a reload request, the process moves to block 212 where a standard HTTP "get" request is sent to the gateway computer 130. The request is for an entity in the content server 140. The client computer 105 may already have a copy of the entity in its cache, but this copy may be different from the entity in the content server 140.

The gateway computer 130 receives the requested entity from the content server 140 and determines if the entity received from the content server 140 is different from the copy of the entity stored in the global cache. When they are different, difference data is calculated. The gateway computer 130 then sets the difference data indicator flag to "1" and sends the difference data to the client computer 105.

At block 215, the client computer 105 receives the data from the gateway computer 130. Note that the client computer 105 at this point does not know if the data is the difference data until it checks the difference data indicator flag. At block 218, a test is made to determine if the data sent by the gateway computer 130 is the difference data. This is done by checking the difference data indicator flag to see if it was set (e.g., to a value of "1") by the gateway computer 130. If the difference data indicator flag is not set (e.g., it has a value of "0"), then the data sent by the gateway computer 130 is an entirely new data entity. This may occur because the client computer does not have this entity in its cache and therefore the gateway computer 130 does not have a mirror copy in the global cache. At block 221, the new data entity is placed into the cache of the client computer. From block 221, the process moves to block 233 where the new data entity is displayed.

From block 218, if the difference indicator is set, then the data sent from the gateway computer 130 is the difference data. At block 224, a current data entity is loaded from the cache of the client computer 105. At block 227, the difference data and the current data entity are merged with each other to create a merged data entity. The merged data entity is the same as the data entity sent by the content server 140 to the gateway computer 130 in response to the HTTP "get" request from the client computer 105. At block 230, the merged data entity is stored into the cache of the client computer 105 and becomes the current data entity. At block 233, the current data entity is displayed. The process ends at block 236.

Figure 3:
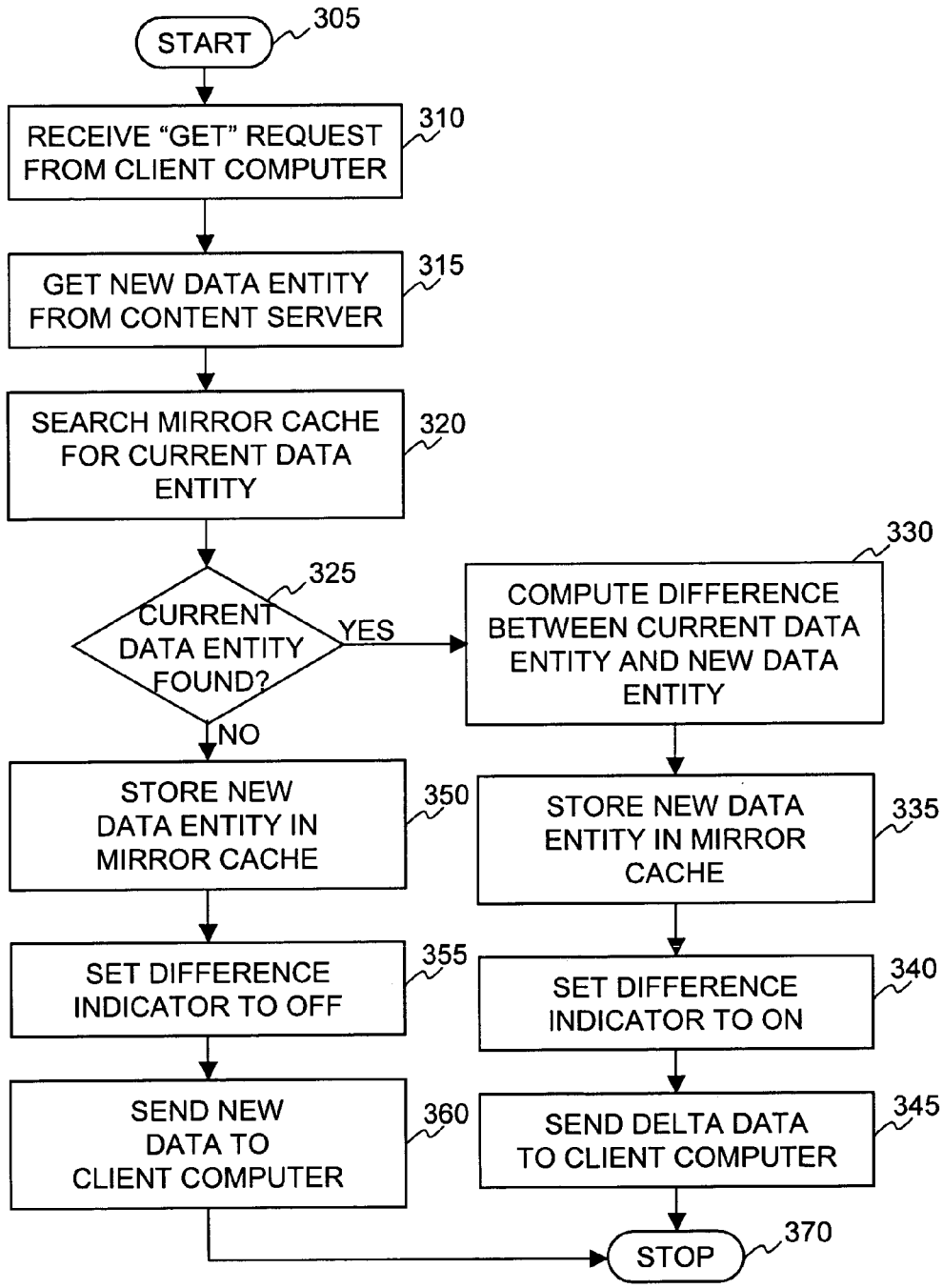
FIG. 3 is a flow diagram illustrating a reload process performed on a gateway computer.

FIG. 3 is a flow diagram illustrating a "reload" process performed on the gateway computer 130. This process uses the client computer 105 as an example of a client computer that initiates a reload request. The process starts at block 305. At block 310, a request for an entity is received from the client computer 105. At block 315, the requested entity is received from the content server 140 responsive to the request received in block 310. At block 320, using the same request, the gateway computer 130 searches its global cache to locate a mirror cache section associated with the client computer 105. At block 325, a search in the mirror cache section is performed to determine if the requested entity is already in the mirror cache. If the requested entity is found, the process moves to block 330 where the gateway computer 130 calculates the difference between the requested entity (or the new data entity) received from the content server 140 and the requested entity (or the current data entity) as stored in the mirror cache section. In one embodiment, the difference is calculated by comparing the Etags. Alternatively, the gateway computer 130 may do a byte-wise comparison to determine the difference. As previously discussed, this comparison generates the difference data.

At block 340, the new data entity is stored in the mirror cache section in the global cache of the gateway computer 130. This mirror cache section is associated with the client computer 105. At block 340, the difference data indicator flag is set (e.g., to "1"). At block 345, the difference data is sent to the client computer 105. The process ends at block 370.

From block 325, if the search in the mirror cache section does not provide the requested entity, this indicates that the client computer 105 does not have a copy of the requested entity. At block 350, the requested data entity received from the content server 140 is stored in the global cache of the gateway computer 130 (in the mirror cache section associated with the client computer 105). At block 355, the difference data indicator is reset (e.g., to "0"). At block 360, the requested data entity is sent to the client computer 105. The process ends at block 370.

Although the process described in FIG. 3 is initiated by receiving a "get" request from the client computer, it may also be applicable when used with server "push" mechanism. For example, the gateway computer may send the difference data to the client computer without having to wait for a "get" request from the client computer. This allows the client computer to automatically receive updates from the content server whenever the relevant resources change.

In one embodiment, when the difference calculation performed in block 330 produces the difference data that is larger in size than the new data entity received from the content server 140, the difference data indicator is set to "0" and the new data entity is stored in the mirror cache section and sent to the client computer 105.

The difference calculation in block 330 may be performed using a set of operations executed on the current data entity stored in the global cache. This set of operations may include "insert", "delete", "skip" and "replace" operations. The "replace" operation is optional since it can be implemented using a sequence of "delete" and "insert" operations. The "replace" operation can however be useful for compactness reasons. Following are examples of the formats for these operations:

INSERT (Byte Count)(Byte string)
DELETE (Byte Count)
REPLACE (Byte Count)(New Byte string)
SKIP (Byte Count)

The INSERT/DELETE/REPLACE/SKIP operations can be codified as single-byte tokens. Following is an example that illustrates coding difference between the sentence "Hello, this is a test" to the sentence "Goodbye, this was a test". In this example, the string "Hello, this is a test" may be viewed as a copy of the resource that exist in the global cache of the gateway computer. The string "Goodbye, this was a test" may be viewed as a copy of the resource as sent by the content server. Each character is one byte long. The operations and the corresponding meanings are:

| Operation | Meaning |
| --- | --- |
| DELETE 5 | (Delete 5 bytes or the word "Hello") |
| INSERT 7 "Goodbye" | (Insert 7 bytes using the string "Goodbye") |
| SKIP 7 | (Skip 7 bytes or ", this ") |
| DELETE 1 | (Delete 1 byte or the letter "i" from the word "is") |
| INSERT 2 "wa" | (Insert 2 bytes using the string "wa"). |

Thus, when the client computer receives a sequence of operations representing the difference data, the client computer can generate the string "Goodbye, this was a test" by applying the sequence of operations to the string "Hello, this is a test" as stored in the local cache of the client computer.

In another embodiment, the difference calculation and codification may be done using a well-known compression algorithm named Lempel-Ziff (or LZ, or LZW). Using the LZW algorithm, the current data entity from the mirror cache is applied to a LZW compressor with the output of the compressor ignored. This has the effect of populating a dictionary used by the compressor with a set of byte strings occurring in the current data entity from the mirror cache with a tokenized value assigned to those byte strings. The new data entity sent from the content server 140 is then fed in the compressor without resetting the dictionary. This allows the compressor to use fragments of the current data entity to codify the new data entity from the content server 140. This approach has the advantage of combining the compression aspect with the difference data encoding effect and would likely cause the difference data sent to the client computer 105 to be small in size. Of course, when the difference codification is used, the client computer 105 needs to be able to use the same codification to generate the new data entity using the data entity in the local cache of the client computer 105.

In one embodiment, instead of sending the differences using the methods described above, an executable program module (e.g., macros, filters, etc.) is sent. For example, the program module, when executed in the client computer 105 may automatically search for the data entity in the local cache of the client computer 105 and update it. The program module may contain mathematical functions and/or regular expressions to handle complex differences. For example, the program module may include capabilities to identify certain ranges of the data entity that need to be updated, in addition to being able to scanning through the entire data entity to apply changes.

Figure 4:
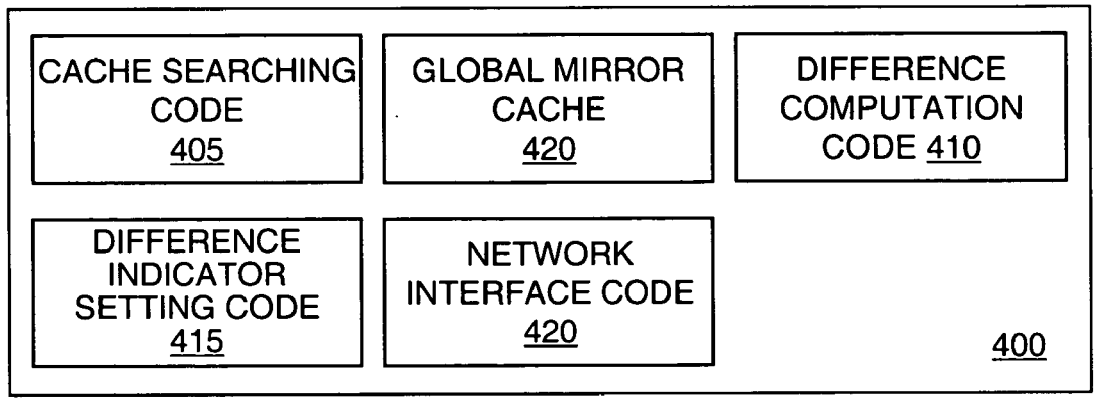
FIG. 4 is a block diagram illustrating one embodiment of a gateway computer in accordance with the present invention.

FIG. 4 is a block diagram illustrating one embodiment of a gateway computer in accordance with the present invention. The gateway computer 400 includes a global mirror cache 420 to store current data entities similar to those in the cache of the multiple client computers 105–120 (as shown in FIG. 1). The gateway computer 400 also includes a cache searching code 405 to locate the requested data entity in the global mirror cache 420. The difference computation code 410 is used to determine the difference between the data entity in the global mirror cache and the data entity sent by the content server 140 (as shown in FIG. 1). As discussed, the difference computation code 410 may employ the LZW compression algorithm to calculate the difference data. The gateway computer 400 may include a difference indicator setting code 415 to indicate that data sent to a client computer is the difference data. Of course, the gateway computer 400 may include other hardware such as, for example, a processor, RAM memory, network interface card, etc, and it may also include other software such as, for example, network interface code 420, etc.

Figure 5:
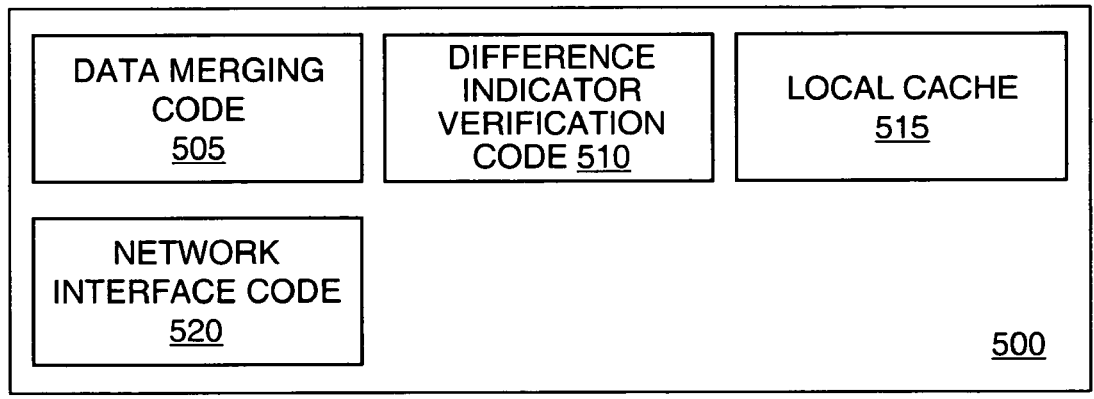
FIG. 5 is a block diagram illustrating one embodiment of a client computer in accordance with the present invention.

FIG. 5 is a block diagram illustrating one embodiment of a client computer in accordance with the present invention. The client computer 500 includes a local cache 515 used to store data entities previously received from the gateway computer. A difference indicator verification code 510 is used to determine if the data received from the gateway computer is the difference data. The data merging code 505 is used to merge the difference data received from the gateway computer with the current data entity existing in the local cache 515. As discussed earlier, the data merging code 505 may employ the LZW compression algorithm. Of course, the client computer 500 may include other hardware such as, for example, a processor, RAM memory, network interface card, etc, and it may also include other software such as, for example, network interface code 520, etc.

Although the methods of the present invention have been described with the transmission of the difference data going from the network to the client computer, the transmission of the difference data may be originated from the client computer. For example, the narrow bandwidth connection 125 illustrated in FIG. 1 may be used to carry an XML (extensible markup language) communication between the client computer 105 and a receiving computer connected to the network 135. The receiving computer may be the content server 140.

There may be different triggering mechanisms used to indicate that incremental change is to be expected by the content server 140. In one embodiment, the client computer 105 may explicitly indicate to the content server 140 to expect receiving incremental changes. In another embodiment, a default list may be used to include a list of documents or document types that the content server 140 can expect receiving incremental changes. Still in another embodiment, the content server 140 may always expect receiving incremental changes. For example, when the content server 140 expects to receive the incremental changes for an XML document, the content server 140 stores a copy of that XML document. When the content server 140 receives data marked by the client computer 105 as the difference data (or incremental change), the content server 140 locates the stored XML document in its memory. The content server 140 then alters the stored XML document using the difference data to create a new XML document. Note that the client computer 105 performs the difference calculation and sends the difference data in this example.

Although the methods described above refer to web pages and XML documents, one skilled in the art will recognize that those methods may also be applied to other data types. For example, the difference data may include filters to images or enhancements to audio streams.

The operations of the various methods of the present invention may be implemented by a processing unit in a digital processing system, which executes sequences of computer program instructions which are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising
identifying, at a gateway, a network resource requested by a user of a client that is coupled to the gateway via a network, a first version of the network resource being stored in the client;
requesting the network resource from a server connected to the network;
performing a comparison of a copy of the first version of the network resource and a second version of the network resource, the comparison performed by the gateway, the copy of the first version stored in the gateway, the second version sent to the gateway from the server; and
when the second version is different from the first version, calculating difference data between the second version and the copy of the first version, sending the difference data to the client coupled with the gateway, and storing the second version in the gateway as the copy of the first version wherein the difference data is sent to the client for merging with the first version of the network resource to generate a copy of the second version of the network resource.

2. The method of claim 1, wherein the client is coupled with the gateway through a narrow bandwidth connection.

3. A computer readable medium having stored thereon sequences of instructions which are executable by a system, and which, when executed by the system, cause the system to:
identify, at a gateway, a network resource requested by a user of a client that is coupled to the gateway via a network, a first version of the network resource being stored in the client;
request the network resource from a server connected to the network;
perform a comparison of a copy of the first version of the network resource and a second version of the network resource, the comparison performed by the gateway, the copy of the first version stored in the gateway, the second version sent to the gateway from the server; and
when the second version is different from the first version, calculating difference data between the second version and the copy of the first version, sending the difference data to the client coupled with the gateway, and storing the second version in the gateway as the copy of the first version wherein the difference data is sent to the client for merging with the first version of the network resource to generate a copy of the second version of the network resource.

4. The computer readable medium of claim 3, wherein the client is coupled with the gateway through a narrow bandwidth connection.

5. A method, comprising:
receiving a request for a network resource from a client using a narrow bandwidth connection, the request including an identifier for the network resource, a current version of the network resource being stored in the client;

getting a new version of the network resource from a content server using the identifier, the content server connected to a network;

determining if a copy of the current version of the network resource exists locally using the identifier;

when the copy of the current version of the network resource exists locally, calculating difference data between the copy of the current version of the network resource and the new version of the network resource, and sending the difference data to the client;

when the current copy of the network resource does not exist locally, sending the new version of the network resource to the client; and storing the new version of the network resource locally as the copy of the current version of the network resource wherein the difference data is sent to the client for merging with the current version of the network resource stored in the client to generate a copy of the new version of the network resource.

6. The method of claim 5, wherein the difference data is calculated using Lempel-Ziff (LZW) compression algorithm.

7. A computer readable medium having stored thereon sequences of instructions which are executable by a system, and which, when executed by the system, cause the system to:

receive a request for a network resource from a client using a narrow bandwidth connection, the request including an identifier for the network resource, a current version of the network resource being stored in the client;

get a new version of the network resource from a content server using the identifier, the content server connected to a network;

determine if a copy of the current version of the network resource exists locally using the identifier;

when the copy of the current version of the network resource exists locally, calculate difference data between the copy of the current version of the network resource and the new version of the network resource, and send the difference data to the client;

when the current copy of the network resource does not exist locally, send the new version of the network resource to the client; and store the new version of the network resource as the copy of the current version of the network resource wherein the difference data is sent to the client for merging with the current version of the network resource stored in the client to generate a copy of the new version of the network resource.

8. The computer readable medium of claim 7, wherein the difference data is calculated using Lempel-Ziff (LZW) compression algorithm.

* * * * *